United States Patent [19]

Knigge

[11] 4,111,814
[45] Sep. 5, 1978

[54] OIL FILTER

[75] Inventor: Heinz Friedrich Knigge, The Hague, Netherlands

[73] Assignee: The Lummus Company, Bloomfield, N.J.

[21] Appl. No.: 761,111

[22] Filed: Jan. 21, 1977

[51] Int. Cl.² .............................................. B01D 29/24
[52] U.S. Cl. ................................. 210/323 T; 196/46.1; 196/127; 196/135; 210/332
[58] Field of Search ............... 210/323 R, 323 T, 340, 210/435, 451, 497 R, 332; 196/127, 135, 46.1

[56] References Cited

U.S. PATENT DOCUMENTS

| | | | |
|---|---|---|---|
| 2,909,285 | 10/1959 | Besler | 210/323 T X |
| 3,133,014 | 5/1964 | Cross, Jr. | 196/127 X |
| 3,170,873 | 2/1965 | May | 210/323 T X |
| 3,401,505 | 9/1968 | Ballard | 210/323 T X |
| 3,527,349 | 9/1970 | Lynch | 210/497 R X |
| 3,839,185 | 10/1974 | Vicard | 210/332 X |

Primary Examiner—William A. Cuchlinski, Jr.
Attorney, Agent, or Firm—Marn & Jangarathis

[57] ABSTRACT

Filter for separating solid particles from an oil in which a vessel is divided into three compartments by a pair of tube sheets, with a plurality of hollow mesh screen filter cartridges, having open tops and bottoms being supported between the tube sheets. Oil to be filtered is introduced into the top compartment and flows into the interior of the cartridge and is filtered by radial flow through the cartridge into the intermediate compartment. The oil flow washes solids from the screen through the open bottom and into the bottom compartment.

7 Claims, 3 Drawing Figures

OIL FILTER

This invention relates to a filter apparatus, and more particularly, to a new and improved apparatus for separating solid particles from an oil; in particular, a quench oil, including solid particles such as coke, employed in a cracking plant.

During naphtha or gas oil cracking operations, coke of various particle size, finds its way into the bottom of the gasoline fractionator, creating operating problems, like plugging pump suction filters, eroding pump casings, and if not properly filtered, tending to plug up the total quench oil circulation system. Such a situation decreases unit on-stream time considerably and also represents operating difficulties for equipment and instrumentation. Cleaning operations of plugged quench oil circulation systems are time-consuming and costly. As ethylene plant capacities have increased over the last years and more and more plants are based on gas oil cracking, coke filtering becomes an increasing problem to operating companies.

Up to the present time, coke removal from quench oil streams is accomplished by the installation of various types of filters at the suction or the discharge of the quench oil pumps or both. In almost all cases, wire mesh screens are applied for above service. Because of the present filter design and the oil velocities employed, the coke particles plug the open areas of the wire mesh screens in a very short time, thus forming a thin layer of coke on the screen. This results in an increase of differential pressure across the filter and causes a shutdown followed by cleaning, although the filters have collected only small amounts of coke. On-stream times are unacceptably short, and emptying of filters and oil handling creates a problem.

An object of this invention is to provide an improved filter for separating solid particles from an oil.

A further object of this invention is to provide a new and improved process for separating coke particles from a quench oil employed in a cracking plant.

These and other objects of the present invention should be more readily apparent from reading the following detailed description thereof.

In accordance with the present invention, there is provided an improved filter apparatus for separating solid particles from an oil wherein a vessel is divided by spaced top and bottom plates or tube sheets, including a plurality of orifices, into three compartments, with a plurality of hollow wire mesh filter cartridges, having open tops and bottoms being supported between the plates with the open tops and bottoms fitted in the orifices of the top and bottom plates, respectively. Solid containing oil is introduced into the top chamber and flows into the hollow interior of the cartridges, with the oil being filtered by passage through the screens into the intermediate compartment between the two plates for removal therefrom. The axial flow of oil into the interior of the cartridges dislodges solids from the screen, which pass through the open bottom of the cartridge into the bottom chamber thereby preventing plugging of the screen.

In accordance with a preferred aspect of the invention, there is provided a catch pot which is connected to the bottom chamber of the filter apparatus through a line including a quick opening valve. Periodically, without taking the filter out of service, the valve is opened and the accumulated solids are pushed into the catch pot. The solid particles can then be removed from the catch pot, and in this manner, removal of solid particles is effected without the necessity of shutting down the filter.

The invention will be further described with respect to the accompanying drawings, wherein.

Figure 1:
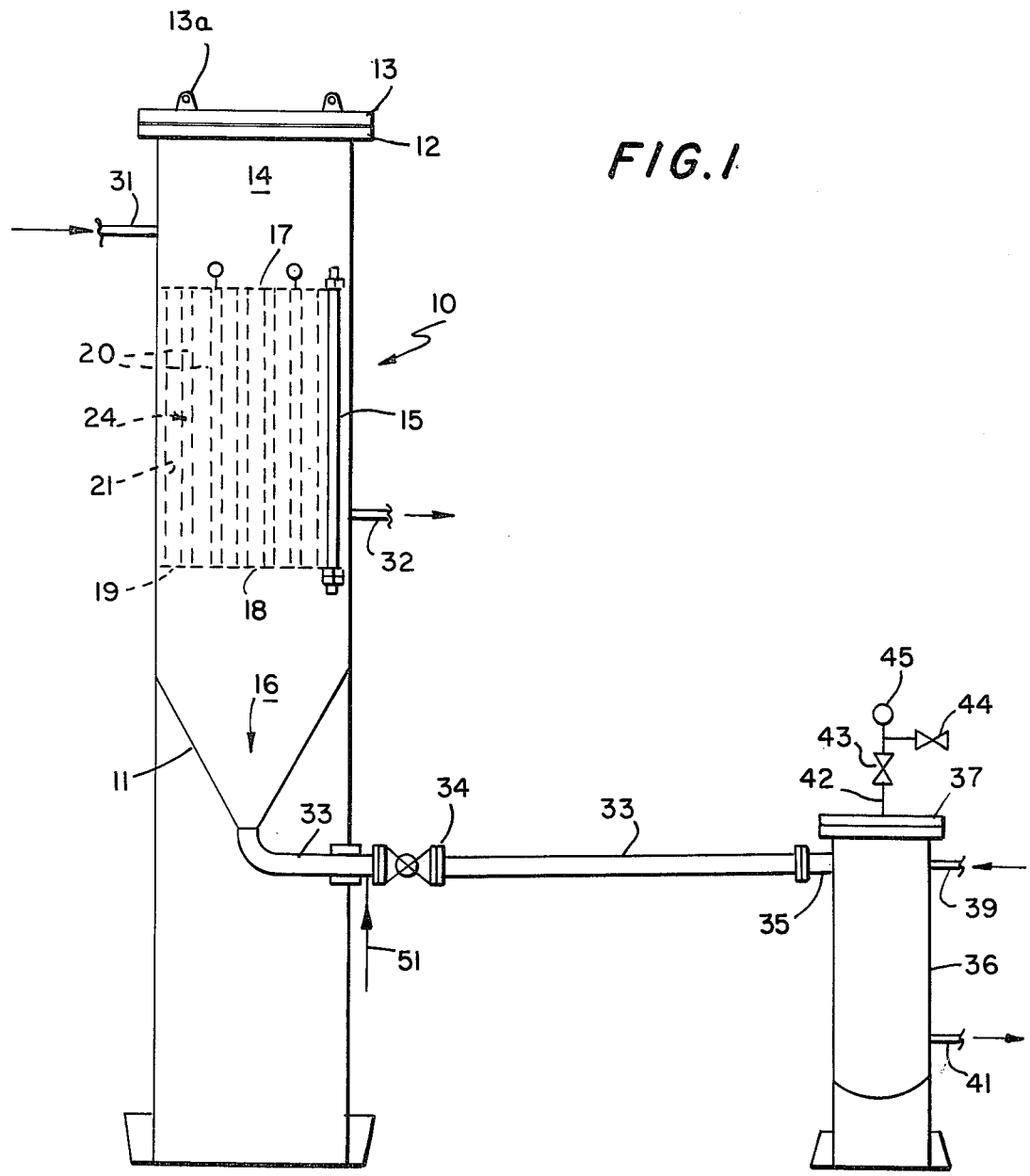
FIG. 1 is a simplified elevational view of the filter of the present invention.
Figure 2:
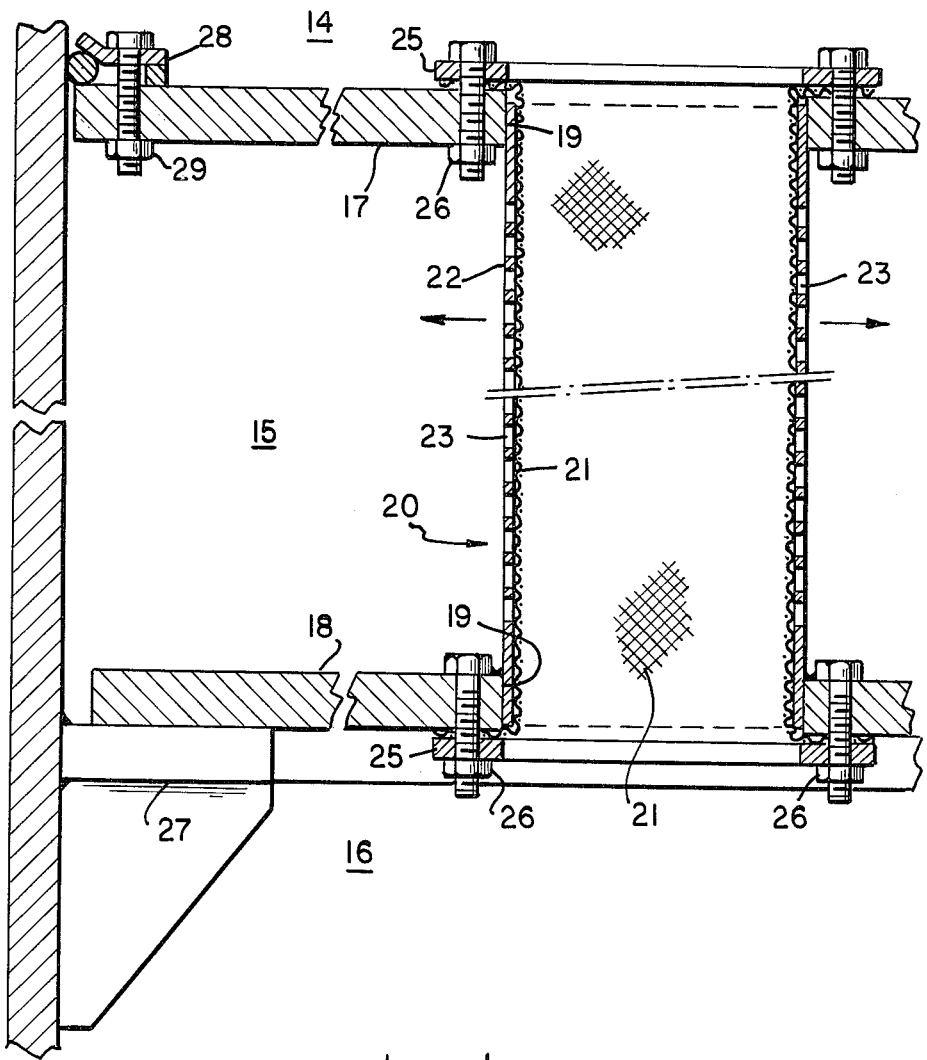
FIG. 2 is a detailed cross-section of the filter of the present invention.

Referring now to the drawing, there is shown a quench oil filter vessel 10, including a conically shaped bottom portion 11 and a top flange 12, to which is fastened, by suitable fastening means, such as bolts (not shown) a cover 13, including lifting lugs 13a for lifting the cover 13 from the vessel 10. The interior of the vessel 10 includes a filter unit or package 24 comprised of a pair of tube sheets 17 and 18 and a plurality of filter cartridges 20.

More particularly, the tube sheets 17 and 18 include a plurality of aligned orifices or holes 19 for receiving the filter cartridges 20 which have open tops and open bottoms. The cartridges 20 are comprised of a cylindrical hollow wire mesh filter screen 21 and an outer rigid cylindrical perforated support plate 22 having oversized holes 23. As should be apparent, the wire mesh screen functions as the filter element with the perforated plate 22 functioning as a support element for the unit. The wire mesh screens have hole sizes to provide for effective removal of coke, with such a size preferably being 3 mm.

The cartridges 20 are secured between the tube sheets 17 and 18 by top and bottom retaining rings 25 which clamp the wire mesh screen to the tube sheets through the use of a suitable nut and bolt assembly, indicated as 26.

The filter unit or package 24 is retained in the vessel between a bottom support ring 27 secured to the interior wall of the vessel and a top support ring 28 to which the top tube sheet is secured by a nut and bolt assembly 29. In this manner, the entire filter unit 24 can be removed from the vessel by unfastening the nut and bolt assembly 29, and lifting the unit 24 from the vessel 10.

The interior of the vessel 10 is divided by the filter unit into a top compartment 14, an intermediate compartment 15 between the tube sheets 17 and 18, and a bottom compartment 16.

The filter vessel 10 is provided with an inlet pipe 31 for introducing solid containing quench oil into the top or inlet compartment 14; an outlet pipe 32 positioned near the bottom of intermediate compartment 15 for withdrawing filtered quench oil therefrom; and an outlet pipe 33 for withdrawing solid components separated from the quench oil.

The outlet pipe 33 includes a quick opening valve, such as ball valve 34, and is connected to the inlet pipe 35 of a catch pot 36, including a quick opening removable cover 37. The pipe 33 is sloped and provided with a steam purge through line 51 to keep pipe 33 free of coke. The catch pot is further provided with an inlet pipe 39 and an outlet pipe 41 for introducing and withdrawing a suitable purge gas, such as nitrogen. The catch pot 36 is further provided with a pressure release line or pipe 42, including valves 43 and 44 and pressure indicator 45 for releasing the pressure in pot 36.

In operation, quench oil, including solid particles, such as coke and the like, is continuously introduced into the inlet compartment 14 of vessel 10 through inlet pipe 31 and flows into the hollow interior of the filter cartridges 21. The quench oil is filtered by radial flow through the filter cartridges 21 into the space between the filter cartridges 21 in compartment 15 and is continuously withdrawn through outlet pipe 32. As a result of the flow of the quench oil downwardly over the interior of the mesh screen, solid particles are dislodged therefrom and pass through the open bottom of the filter cartridges 21 into the bottom chamber 16.

In normal operation, the valve 34 is closed and the catch pot 36 is maintained with a nitrogen atmosphere at about atmospheric pressure. The nitrogen purge of the pot 36 removes any combustible gases from the pot 36. The bottom compartment 16 of the filter 10 is periodically cleaned of coke by opening the valve 34, while the filter remains in operation, whereby the accumulated coke particles are forced into the catch pot 36 by the pressure in the filter vessel, generally in the order of 7-9 kg/cm$^2$.

The valve 34 is then closed, followed by depressurization of the catch pot and removal of the cover 37 to enable removal of coke from the catch pot 36.

Figure 3:
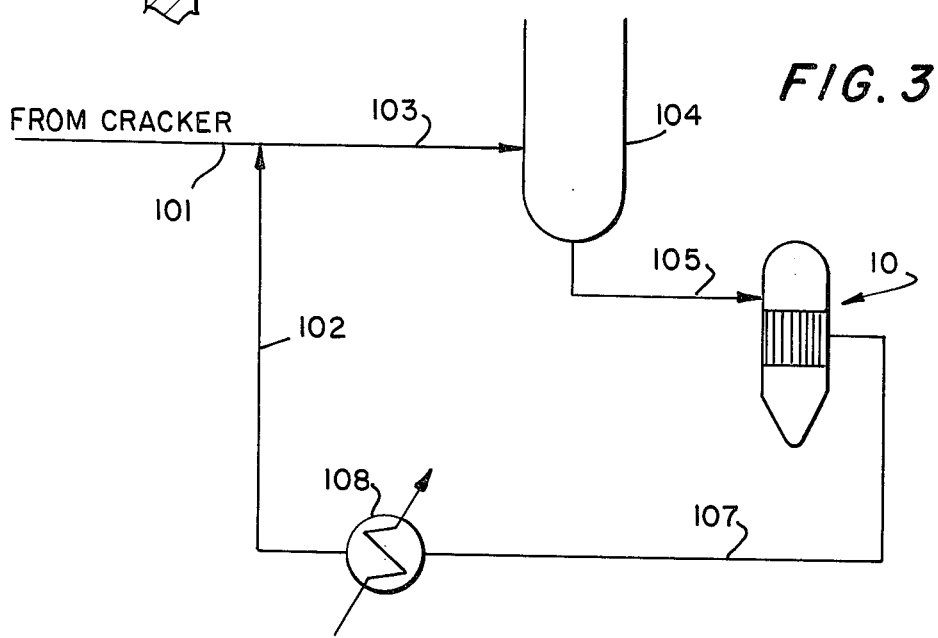
FIG. 3 is a simplified schematic flow diagram of quench oil system incorporating the filter of the present invention.

The filter of the present invention is preferably employed for filtration of a quench oil employed in a cracking process, and such use is schematically indicated in FIG. 3.

Referring to FIG. 3, a cracking effluent produced, for example, by the cracking of a naphtha or gas oil, in line 101 is directly contacted with a quench oil in line 102 to effect cooling thereof and the combined stream in line 103 introduced into a gasoline fractionator, of a type known in the art, and schematically indicated as 104.

A bottoms stream, which includes coke particles, is withdrawn from fractionator 104 through line 105 for use as a quench oil, with such stream being introduced into the quench oil filter vessel 10 of the present invention for removal of coke particles. Although a single filter is shown, it should be apparent that in a commercial operation, there will be several parallel filter units.

The filtered quench oil is withdrawn from filter 10 through line 107, including a cooler 108 for use as quench oil in line 102.

The present invention is particularly advantageous in that the filter can be employed for removing coke from a circulating quench oil without necessitating frequent cleaning in order to prevent plugging of the filter. In addition, coke can be effectively removed from the filtering vessel without the necessity of taking the filter off-stream.

These and other advantages should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A filtering apparatus for separating solid coke particles from an oil, comprising:
a vessel;
a pair of axially spaced plates, including a plurality of orifices dividing the vessel into a first chamber, a second chamber between the plates and a third chamber;
a plurality of hollow filter cartridges having open tops and bottoms supported between the pair of axially spaced plates with the open tops and bottoms in alignment with the orifices in the plates, said filter cartridges being comprised of an annular wire mesh filter screen having hole sizes to provide for effective removal of coke particles from an oil, and a perforated annular rigid support plate surrounding the wire mesh filter screen having hole sizes larger than the hole sizes of the wire mesh filter screen, said wire mesh filter screen being the inner wall of the cartridge defining a hollow interior of the cartridge in communication with the first and third chambers through the orifices in the plates whereby fluid introduced into the hollow interior of the cartridge initially flows through the wire mesh filter screen;
an inlet pipe for introducing an oil containing solid coke particles into the first chamber;
a first outlet pipe for withdrawing filtered oil from the second chamber; and
a second outlet pipe for withdrawing solid coke particles from the third chamber whereby oil containing solid coke particles introduced into the first chamber flows into the hollow interior of the filter cartridge and is filtered by passage through the wire mesh filter screens into the second chamber, said oil flow dislodging solid coke particles from the wire mesh filter screen which pass through the open cartridge into the third chamber.

2. The apparatus of claim 1 and further comprising:
a catch pot including an inlet pipe, a pressure release line and removable cover;
pipe means including a valve connecting the second outlet pipe with the inlet pipe of the catch pot, whereby solid particles accumulated in the third chamber can be periodically withdrawn from the third chamber and introduced into the catch pot by opening the valve, without interruption of the filtering operation, with solid particles being removed from the catch pot by depressurization thereof through the pressure release line and removing of said removable cover.

3. The apparatus of claim 2 wherein the pair of axially spaced plates and filter cartridges are secured together in a single unit which is removable from the vessel.

4. The apparatus of claim 3 wherein the wire mesh filter screens are each removably clamped to each of said pair of axially spaced plates.

5. A quench oil system, comprising:
a fractionator, a quench oil cooler and a quench oil filter, said quench oil filter comprising a filter vessel, a filter package in said vessel, said filter package comprising a pair of axially spaced plates including a plurality of aligned orifices and a plurality of hollow filter cartridges having open tops and bottoms secured to the top and bottom plates with the open tops and bottoms in alignment with the orifices in the plates, said filter cartridges being comprised of an annular wire mesh filter screen having hole sizes to provide for effective removal of coke particles from an oil, and a perforated annular rigid support plate surrounding the wire mesh filter screens having hole sizes larger than the hole sizes of the wire mesh filter screens, said wire mesh filter screens being the inner wall of the cartridge defining a hollow interior of the cartridge in alignment with the orifices in the plates, said filter unit being removably secured to the vessel and dividing the vessel into a first chamber, a second chamber between the plates and a third chamber;

an inlet pipe for introducing quench oil containing solid particles from the fractionator into the first chamber;

a first outlet pipe for withdrawing filtered oil from the second chamber for passage to the quench cooler;

a second outlet pipe for withdrawing solid coke particles from the third chamber whereby oil containing solid particles introduced into the first chamber flows into the hollow interior of the filter cartridges for initial flow through the wire mesh filter screens into the second chamber, said oil flow dislodging solid particles from the wire mesh filter screens which pass through the open cartridges into the third chamber.

6. The system of claim 5 and further comprising:

a catch pot including an inlet pipe;

pipe means including a valve connecting the second outlet pipe with the inlet pipe of the catch pot, whereby solid particles accumulated in the third chamber can be periodically withdrawn from the third chamber and introduced into the catch pot.

7. The system of claim 6 wherein each of the wire mesh filter screens is removably clamped to each of said pair of axially spaced plates.

* * * * *